US007209934B2

(12) United States Patent
Atchison

(10) Patent No.: US 7,209,934 B2
(45) Date of Patent: Apr. 24, 2007

(54) METHODS, SYSTEMS AND COMPUTER PROGRAM PRODUCTS FOR MONITORING FILES

(75) Inventor: Charles Atchison, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 438 days.

(21) Appl. No.: 10/718,847

(22) Filed: Nov. 21, 2003

(65) Prior Publication Data
US 2005/0114403 A1 May 26, 2005

(51) Int. Cl.
*G06F 17/30* (2006.01)
(52) U.S. Cl. ...................................... 707/205
(58) Field of Classification Search ............ 707/1, 707/2, 9, 10, 200, 205; 709/232, 224
See application file for complete search history.

(56) References Cited
U.S. PATENT DOCUMENTS 6,182,222 B1 * 1/2001 Oparaji ........................ 726/17
6,212,512 B1 * 4/2001 Barney et al. ................ 707/1
2002/0194358 A1 * 12/2002 D'Aviera ................... 709/232
2003/0055844 A1 * 3/2003 Rudd et al. ................ 707/200

* cited by examiner

*Primary Examiner*—Etienne P LeRoux
(74) *Attorney, Agent, or Firm*—Cantor Colburn LLP

(57) ABSTRACT

A method for monitoring files including receiving a folder including at least one file path specifying a server machine and a directory. For one or more of the file paths in the folder, a query is transmitted to the server machine requesting current directory data corresponding to the directory. The current directory data includes a file name, a created date, a modified date and a file size for files included in the directory. Current directory data is received from the server machine in response to the query and the current directory data is stored in a monitoring database. The method also includes creating a monitoring report including the server machine, the directory and the current directory data for the one or more file paths. The monitoring report is transmitted to a user.

21 Claims, 6 Drawing Sheets

METHODS, SYSTEMS AND COMPUTER PROGRAM PRODUCTS FOR MONITORING FILES

FIELD OF THE INVENTION

The present disclosure relates generally to monitoring files and in particular, to methods of verifying the existence and size of files contained in specified directories.

BACKGROUND OF THE INVENTION

The volume of information being stored on computer systems has exploded in recent years. Modem corporations have become increasingly dependent on the accuracy of data stored in computers for running their day-to-day operations. Computer data and computer processing is no longer contained to a single geographic site but instead may span multiple sites via high-speed network connections and distributed processing capabilities. Backup data files are created for production data (e.g., databases, files) on a regular basis. The frequency of creating backups (e.g., daily, weekly, monthly, quarterly, yearly) may depend on factors such as the type of data, the volatility of the data and other business requirements. For security and/or capacity reasons, backup data may be stored in a geographic location that is separate from the production application and data. After each backup job is executed, it is important that an employee, such as a system administrator, verifies that the backup job has successfully completed and created a "good" backup copy of the production data. Having a good backup file is an integral part of data recovery plans and/or disaster recovery plans that may need to be implemented by the corporation.

To perform the monitoring of backup files, system administrators typically logon to multiple machines and directories each morning to verify that databases and other files have been successfully backed up during the previous evening. This task often requires the system administrator to verify not only the existence of the files but also to check the size of the files. If a current backup file is smaller in size than the previous backup file, then this is a sign for the system administrator that the backup file should be further investigated because it may contain incomplete data. As the number of server systems, directories and files becomes more numerous, checking each file manually can become a tedious and error prone process for the system administrators.

SUMMARY OF THE INVENTION

Embodiments of the present invention include a method for monitoring files. The method includes receiving a folder including at least one file path specifying a server machine and a directory. For one or more of the file paths in the folder, a query is transmitted to the server machine requesting current directory data corresponding to the directory. The current directory data includes a file name, a created date, a modified date and a file size for files included in the directory. Current directory data is received from the server machine in response to the query and the current directory data is stored in a monitoring database. The method also includes creating a monitoring report including the server machine, the directory and the current directory data for the one or more file paths. The monitoring report is transmitted to a user.

Other embodiments of the present invention include a system for monitoring files including a network and a storage device in communication with the network. The storage device includes a monitoring database. The system further includes a host system in communication with the network. The host system includes application software to implement a method that includes receiving a folder including at least one file path specifying a server machine and a directory. For one or more of the file paths in the folder a query is transmitted via the network to the server machine requesting current directory data corresponding to the directory. The current directory data includes a file name, a created date, a modified date and a file size for files included in the directory. Current directory data is received from the server machine via the network in response to the query and the current directory data is stored in the monitoring database. A monitoring report that includes the server machine, the directory and the current directory data for the one or more file paths is created. The monitoring report is then transmitted to a user.

Further embodiments of the present invention include a computer program product for monitoring files including a storage medium readable by a processing circuit and storing instructions for execution by the processing circuit for facilitating a method for receiving a folder including at least one file path specifying a server machine and a directory. For one or more of the file paths in the folder, a query is transmitted to the server machine requesting current directory data corresponding to the directory. The current directory data includes a file name, a created date, a modified date and a file size for files included in the directory. Current directory data is received from the server machine in response to the query and the current directory data is stored in a monitoring database. The method also includes creating a monitoring report including the server machine, the directory and the current directory data for the one or more file paths. The monitoring report is transmitted to a user.

Other systems, methods and/or computer program products according to embodiments will be or become apparent to one with skill in the art upon review of the following drawings and detailed description. It is intended that all such additional systems, methods, and/or computer program products be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE INVENTION

Exemplary embodiments of the present invention include a method for monitoring files by providing an automated process of verifying the existence and size of files contained in specified directories (local or remote). A user may specify a local directory by entering a drive name and directory name. The user may also specify a directory located on a remote server by entering an Internet protocol (IP) address and directory name. Exemplary embodiments of the present invention return (e.g., by e-mail, via an application status window) the names, sizes and modification dates of all files found in the specified directories. The user can then compare the results to the previous day's (or week's or month's or etc.) results. Alternate exemplary embodiments of the present invention include the ability for the method to proactively compare current backup results to previous backup results and then to alert the user of any discrepancies, thus further automating the monitoring process. Exemplary embodiments of the present invention may be utilized by server administrators, database administrators and web masters who are concerned with verifying the existence and/or monitoring the size of log files, backup files or any other non-static files.

Figure 1:
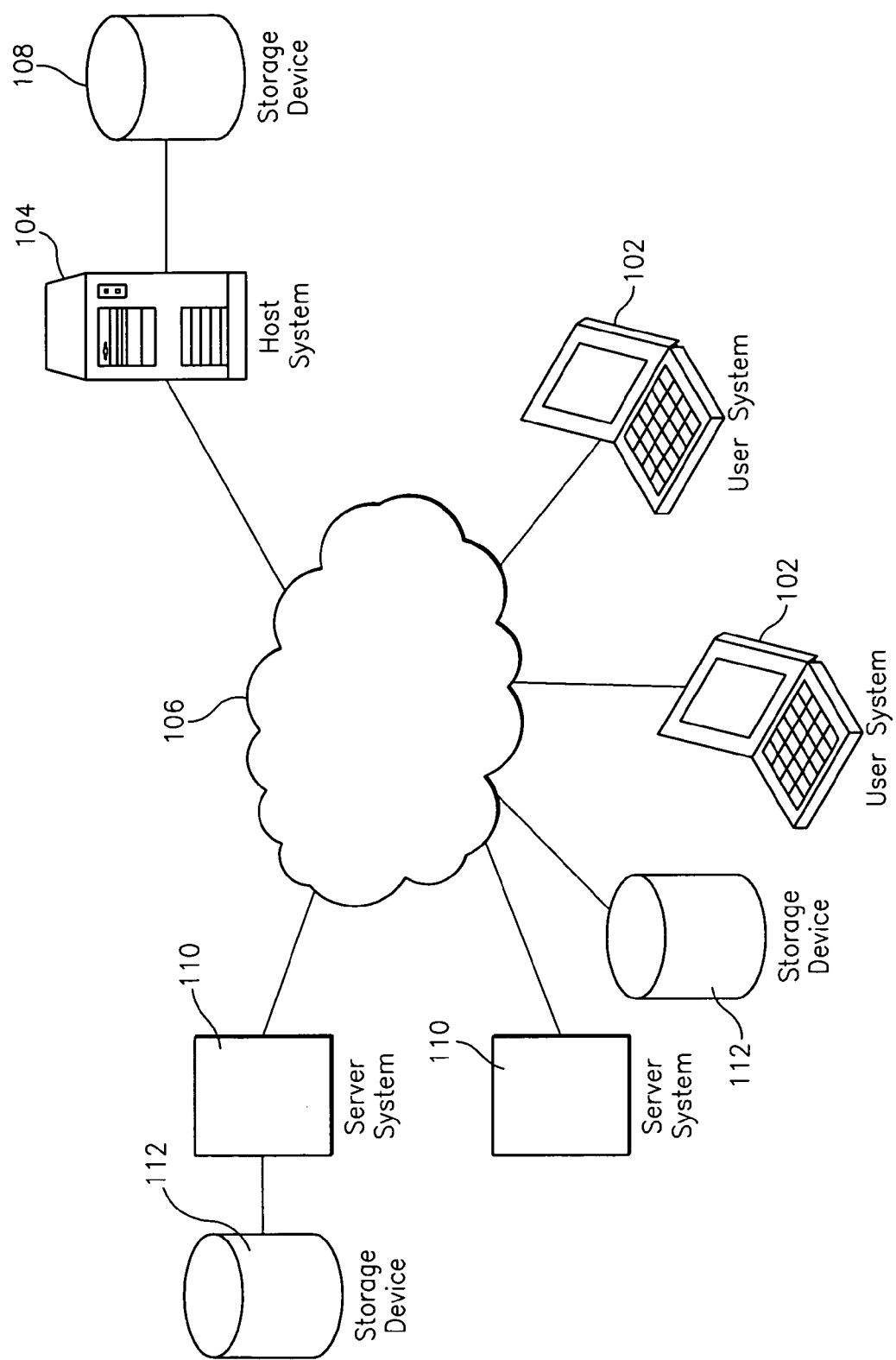
FIG. 1 is a block diagram of an exemplary system for monitoring files.

In FIG. 1, a block diagram of an exemplary system for monitoring files is generally shown. The exemplary system includes a host system 104 for executing a file monitoring application. The system in FIG. 1 also includes one or more user systems 102 through which users such as server administrators, database administrators and web masters located at one or more geographic locations may contact the host system 104 to initiate the execution of the file monitoring application. In exemplary embodiments of the present invention, the host system 104 executes the file monitoring application and the user system 102 is coupled to the host system 104 via a network 106. Each user system 102 may be implemented using a general-purpose computer executing a computer program for carrying out the processes described herein. The user system 102 may be a personal computer (e.g., a lap top, a personal digital assistant) or a host attached terminal. If the user system 102 is a personal computer, the processing described herein may be shared by a user system 102 and the host system 104 (e.g., by providing an applet to the user system 102).

The network 106 may be any type of known network including, but not limited to, a wide area network (WAN), a voice over Internet protocol (VOIP) network, a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and LAN) so that not all user systems 102 are coupled to the host system 104 through the same network. One or more of the user systems 102 and the host system 104 may be connected to the network 106 in a wireless fashion.

The storage device 108 depicted in FIG. 1 may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. The physical data may be located in a variety of geographic locations depending on application and access requirements. Information stored in the storage device 108 may be retrieved and manipulated via the host system 104. The storage device 108 includes a monitoring database and a log file of file monitoring application results. In exemplary embodiments of the present invention, the monitoring database is relational and includes a list of file paths associated with one or more folders. The use of multiple folders allows different trigger events to initiate the file monitoring application for different lists of file paths and/or to allow subsets of the results to be sent to different sets of users.

The storage device also includes a log file containing copies of file monitoring data that is collected each time that the file monitoring application is executed. This data may include: date and time that the file monitoring application was executed; server name; directory name; file name; created date; modified date and size. The administrator may choose how and when to purge the log file for particular folders or files. The storage device 108 may also include other kinds of data such as information concerning the set-up of the file monitoring folders (e.g., date and time of set-up). In exemplary embodiments of the present invention, the host system 104 operates as a database server and coordinates access to application data including data stored on storage device 108. Access to data contained in the monitoring database may be restricted based on user characteristics.

The host system 104 depicted in FIG. 1 may be implemented using one or more servers operating in response to a computer program stored in a storage medium accessible by the server. In exemplary embodiments of the present invention, the host system 104 is a personal computer. In alternate exemplary embodiments of the present invention, the host system 104 and user system 102 are the same physical machine (e.g., a personal computer) and the storage device 108 is contained within the physical machine. The host system 104 may operate as a network server (e.g., a web server) to communicate with the user system 102. The host system 104 handles sending and receiving information to and from the user system 102 and can perform associated tasks. In exemplary embodiments of the present invention, the host system 104 is running an operating system such as Windows 2000 or Windows NT 4.0. The host system 104 may reside behind a firewall to prevent unauthorized access to the host system 104 and enforce any limitations on authorized access. A firewall may be implemented using conventional hardware and/or software as is known in the art.

The host system 104 may also operate as an application server. The host system 104 executes one or more computer programs to monitor the existence and size of files that are contained in file paths (e.g., server/directory) specified in a folder. These files may be accessed via the host system 104 or via a remote server system 110. The server portion of a file path specifies whether a file to be monitored is accessed via the host system 104 or via one of the server systems 110. The actual backup files may be located on storage devices 112 that are connected directly to a server system 110 or storage devices 112 that are in communication with a server system 110 via a network 106. In exemplary embodiments of the present invention, the server portion of the file path contains the IP address of the server system 110 containing the directory. The processing of the file monitoring application may be shared by a user system 102 and the host system 104 by providing an application (e.g., java applet) to the user system 102. In exemplary embodiments of the present invention, the file monitoring application is written in Visual Basic 6.0 and may execute as a background application. As previously described, it is understood that separate servers may be utilized to implement the network server functions and the application server functions. Alternatively, the network server, the firewall, and the application server may be implemented by a single server executing computer programs to perform the requisite functions.

Figure 2:
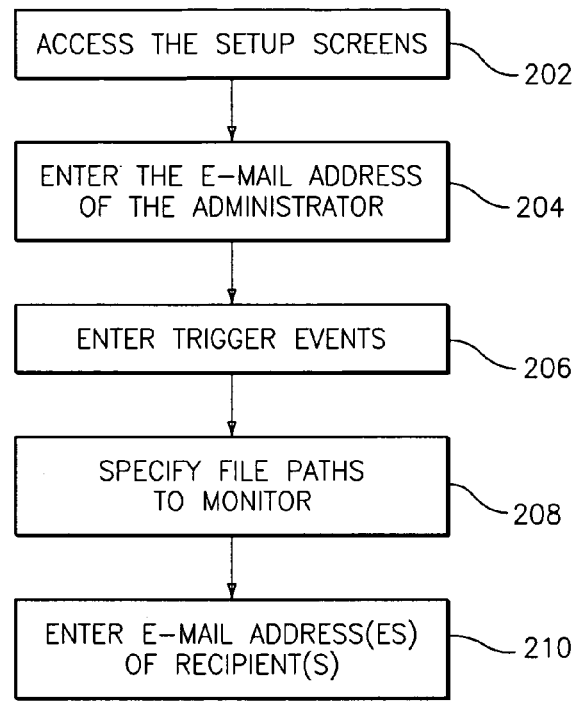
FIG. 2 is flow diagram of an exemplary process for setting up files to be monitored and users to be notified by a file monitoring application.
Figure 3:
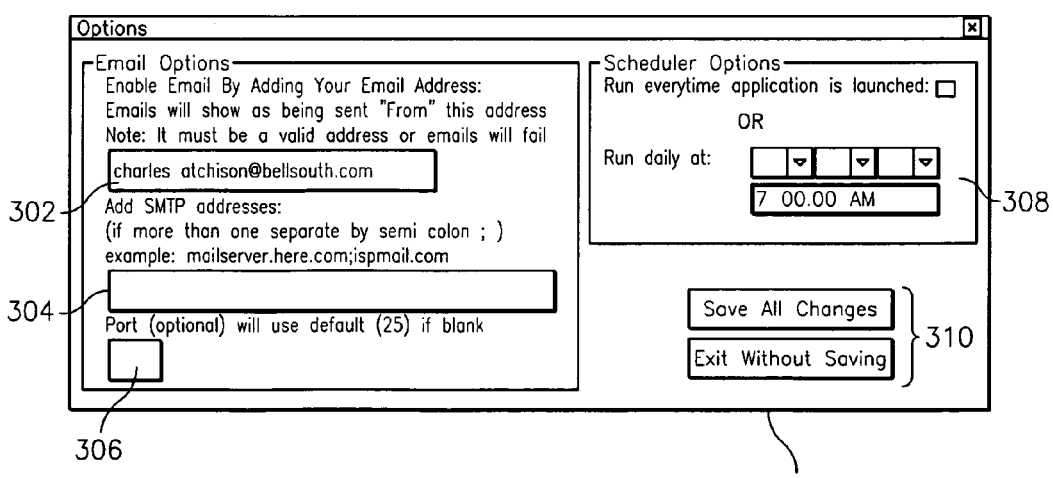
FIG. 3 is an exemplary user interface for setting up an e-mail notification of monitoring results.

FIG. 2 is flow diagram of an exemplary process for setting up files to be monitored and users to be notified by the file monitoring application. This process is utilized to set up a folder that contains one or more file paths to be monitored. Any number of folders may be created with any combinations of file paths by executing the process described in reference to FIG. 2. At step 202, the user (e.g., an administrator) accesses the set-up screens located in the file monitoring application. A user interface screen such as the one depicted in FIG. 3 may be presented to the user. At step 204, the user enters the e-mail address of the administrator (see administrator entry box 302 in FIG. 3). This address is the address that will appear as the "from" address when the file monitoring application sends monitoring results via an e-mail to recipients (e.g., server administrators, database administrators, web masters). Also at step 202, the user will be prompted to enter one or more SMTP server addresses (see SMTP entry box 304 in FIG. 3) and optionally a port (see port entry box 306 in FIG. 3). If a value is not entered in the port entry box 306 a default value (e.g., "25") will be assumed by the file monitoring application. The default value "25" may be utilized because many SMTP servers use port "25" for delivery. However, if a SMTP server uses any other port, it may be specified in the port entry box 306. The SMTP address entered in the SMTP entry box 304 represents the mail server that will be utilized to send e-mail notifications to the recipients. To utilize the e-mail option, one or more valid SMTP addresses must be provided. Multiple SMTP address may be utilized for failover in case one fails. In exemplary embodiments of the present invention, when multiple SMTP addresses are specified they are separated by a semi-colon.

Next, step 206 in FIG. 2 is performed to specify trigger events that will cause the file monitoring application to be initiated for the directories in the folder. The file monitoring application for the file paths in the folder may be executed each time that the file monitoring application is launched (see scheduler box 308 in FIG. 3). This option may be utilized by a user that requires that the file monitoring application be run several times a day for the particular directories contained in the folder. A component, such as a Windows scheduler may be utilized to run the application as often as necessary. Alternatively, the file monitoring application for the file paths in the folder may be executed at pre-selected times (see scheduler box 308 in FIG. 3). If this second option is selected, any scheduler application (third party or in-house) known in the art may be utilized to trigger the execution. In alternate exemplary embodiments of the present invention, the file monitoring application may be executed in response to external events, such as when a file is updated or as a step in a batch job stream. Combinations of these methods may also be implemented utilizing exemplary embodiments of the present invention. Note also, that the user can select the "Run" option from a file monitoring application main toolbar to activate the file monitoring application processes at any time for the file paths in the folder created during the current set-up process. Once the data is input, the user may select to either save all changes or to exit without saving (see exit box 310 in FIG. 3).

Figure 4:
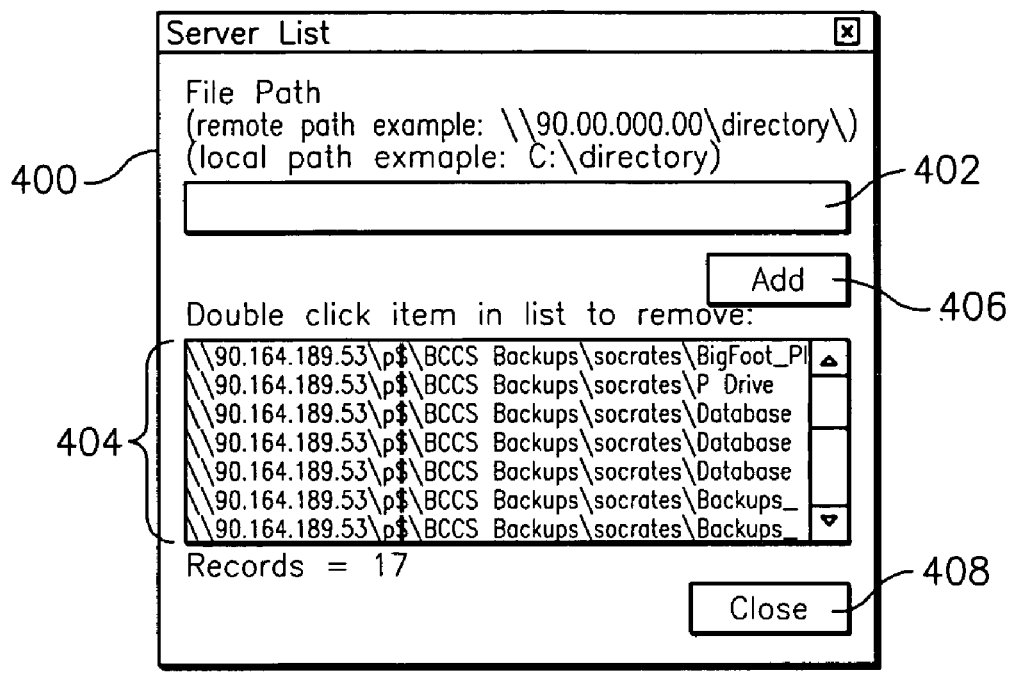
FIG. 4 is an exemplary user interface for specifying file paths to be monitored.

Referring back to FIG. 2, at step 208, the user specifies the file paths to be monitored by the file monitoring application. A user interface screen such as the one depicted in FIG. 4 may be utilized to perform step 208 in FIG. 2. The files paths (server/directory combinations) may be remote and/or local and are entered by the user into the file path entry box 402 in FIG. 4. For data files located on or accessed via the host system 104, the file path would identify a drive and a directory (e.g., "c\directory\"). Data files located on or accessed via remote server systems 110 would have a file path that identifies both a server address and a directory (e.g., "\\90.00.000.00\directory\"). Once the user enters the file path, an add button is selected (see add button 406 in FIG. 4) to add the sever/directory combination to the current folder (see list box 404 in FIG. 4). As shown in the user interface depicted in FIG. 4, a user may remove a file path from the list box 404, or folder, by double clicking on the file path. In exemplary embodiments of the present invention there is no limit to the number of servers and directories that may be contained in the folder. In addition, there is no limit to the number of folders that may be created by repeating the process outlined in FIG. 2.

Figure 5:
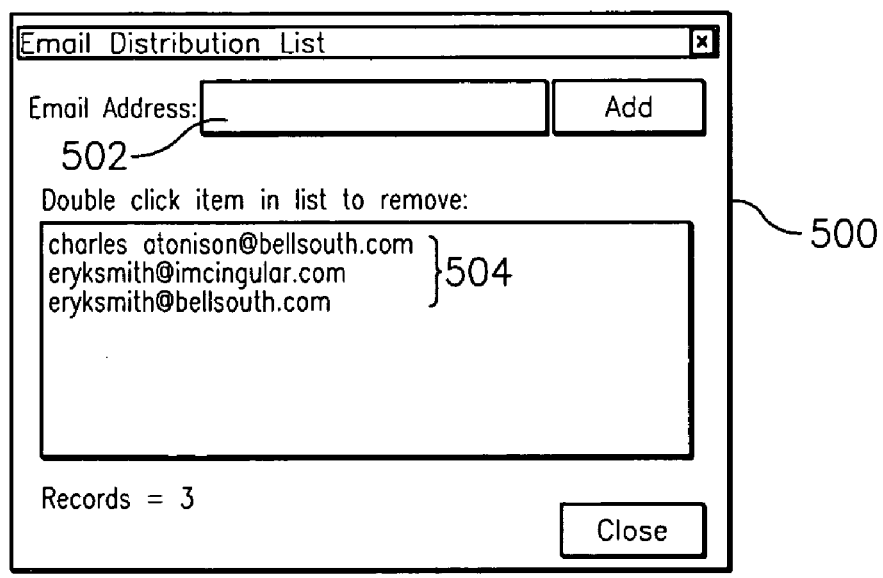
FIG. 5 is an exemplary user interface for specifying recipient e-mail addresses.

At step 210 in FIG. 2, the e-mail addresses of recipients of the file monitoring application results for the folder are entered by the user into a user interface screen such as the one depicted in FIG. 5. One or more recipient e-mail addresses are entered into a recipient e-mail address entry box 502 as depicted in FIG. 5. The recipient e-mail addresses are presented to the user as shown in the list box 504 in FIG. 5. Each time that the file monitoring application is executed for this folder, each of these e-mail addresses will be sent a listing of the results. The lists of e-mail addresses and file paths are stored in the storage device 108. In exemplary embodiments of the present invention, a test e-mail be sent to verify that the e-mail capability has been properly configured for the folder. Each recipient in the list of e-mail addresses will receive a test message when this option is utilized and the message will be identified as a test message.

Figure 6:
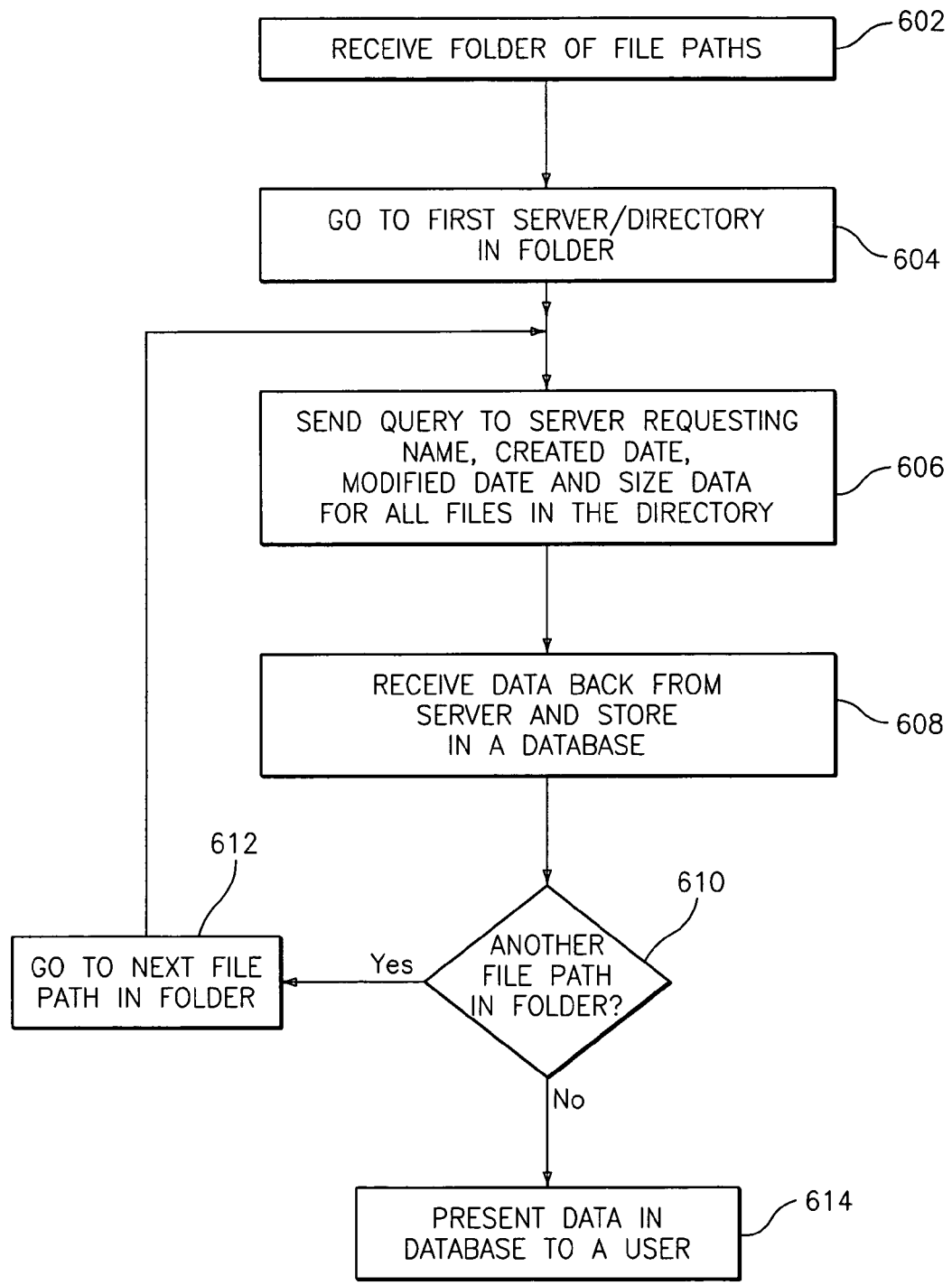
FIG. 6 is a flow diagram of an exemplary process for monitoring files.

FIG. 6 is a flow diagram of an exemplary process for monitoring files when a trigger event occurs. Any trigger event set up at step 206 in FIG. 2 could have occurred and caused the file monitoring application to execute for a particular folder. At step 602, a list of file paths (e.g., server/directory combinations) included in the folder is received by the file monitoring application. This is the list that was created at step 208 in FIG. 2. At step 604, the file monitoring application accesses the first file path in the folder. Next, at step 606, the file monitoring application sends a query to the server/directory combination found in the file path. If the file path is local (e.g., on the host system 104) then a query is sent to the host system 104. If the file path specifies a remote server/directory combination (e.g., on a server system 110) then a query is sent to the server system 110 specified by the address in the server/directory combination. The query sends the directory and requests the name, creation date, modified date and size data for any files contained in the directory.

Figure 7:
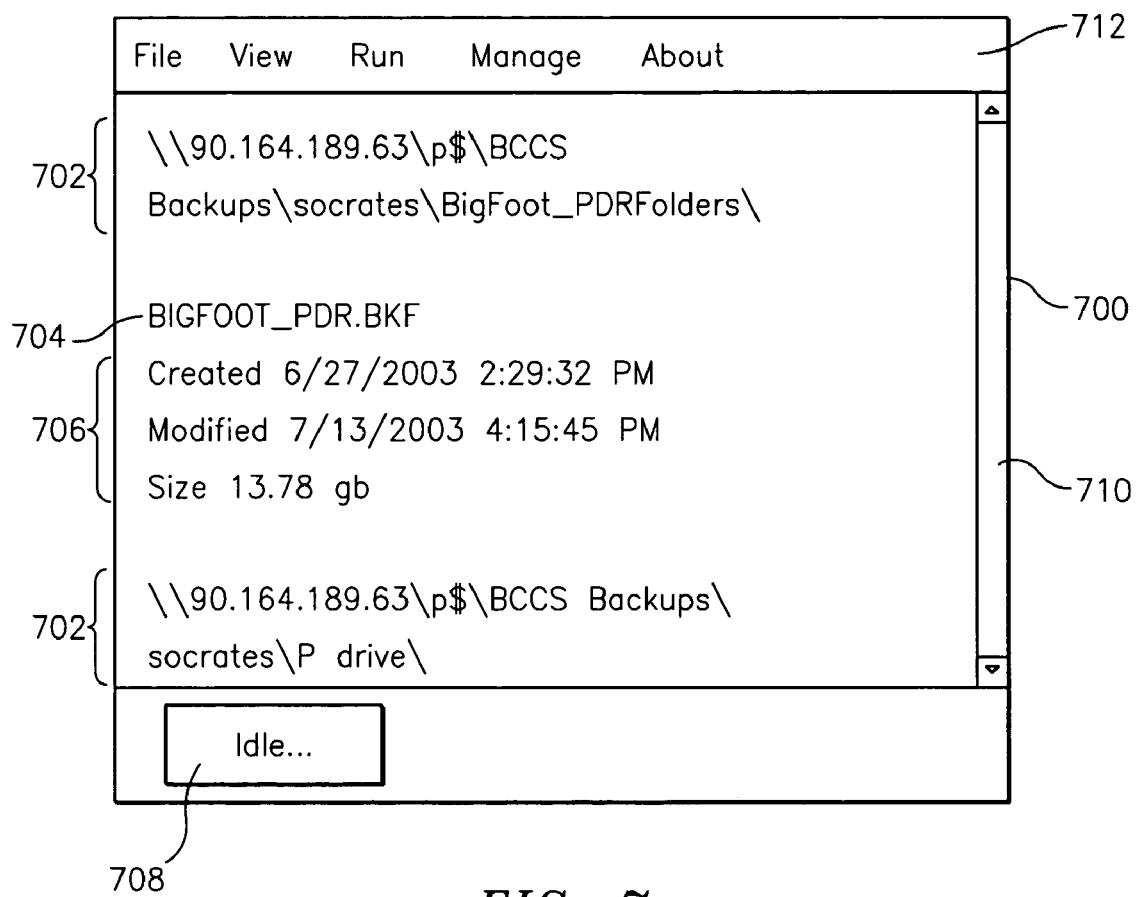
FIG. 7 is an exemplary user interface for displaying a file monitoring application status window.
Figure 8:
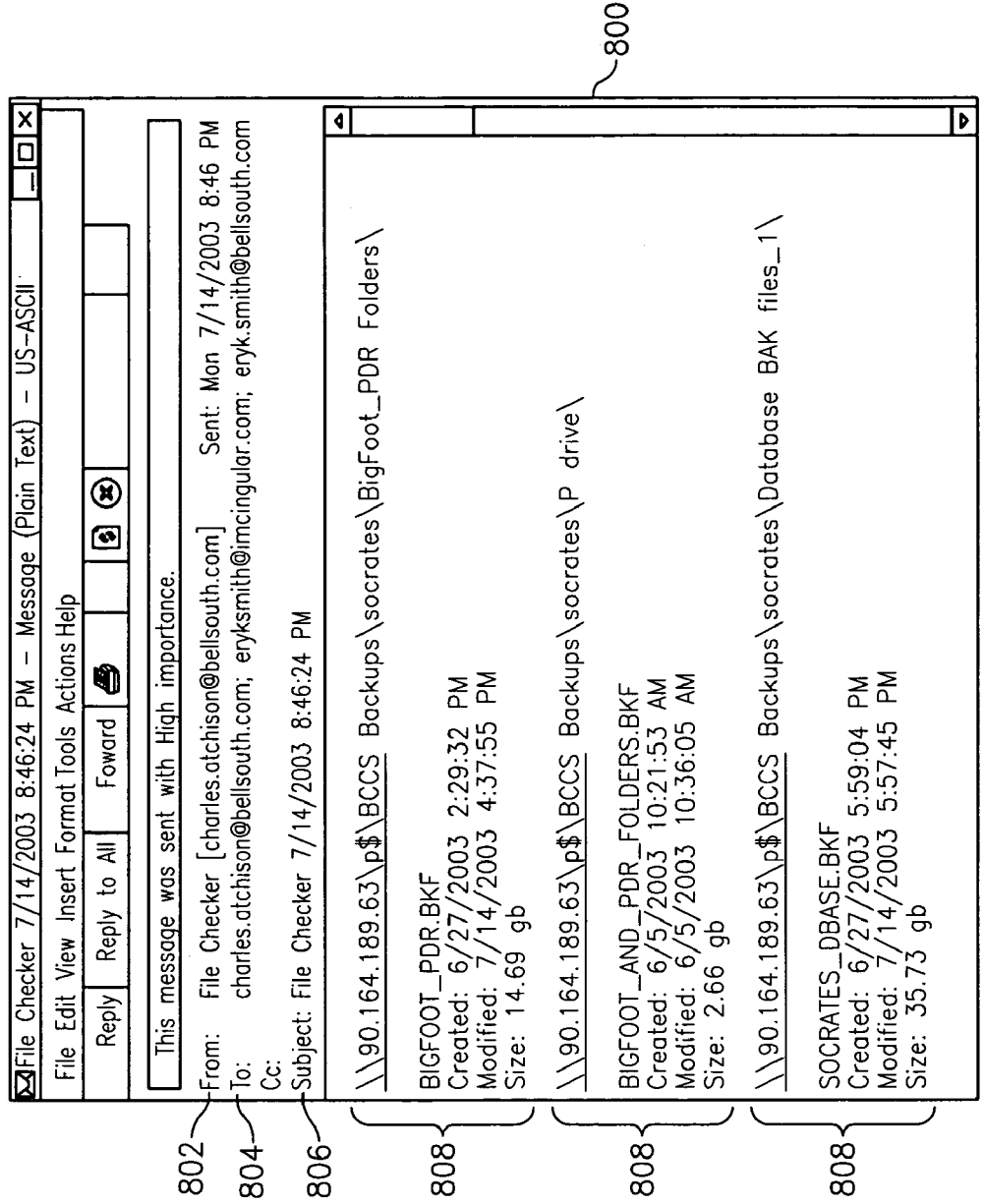
FIG. 8 is an exemplary e-mail notification format that may be utilized by exemplary embodiments of the present invention.

At step 608, the file monitoring application receives data back from the server specified by the file path (e.g., the host system 104, a server system 110). This data, along with the file path is then stored in a monitoring database located on the storage device 108. Before the new data is stored, the previous copy of the data may be archived to a log file. Next, step 610 is performed to determine if there is another file path in the folder. If there is another file path in the folder, then step 612 is performed to go to the next file path in the folder and the loop starting at step 606 is performed for the next file path in the folder. If there are no more file paths in the folder, as determined at step 610, then step 614 is performed and the monitoring data received by the file monitoring application for directories contained in the folder is presented to the user. In exemplary embodiments of the present invention, a file monitoring application status window, such as the one depicted in FIG. 7 is displayed to the administrator of the system. Additionally, an exemplary e-mail notification formatted like the one depicted in FIG. 8 is e-mailed to the recipients listed in step 210 of FIG. 2.

FIG. 7 is an exemplary user interface for displaying a file monitoring application status window in a basic window style user interface (e.g., including a toolbar 712). The window style user interface allows the user to intuitively access the file monitoring application features. Once the process described in reference to FIG. 6 has completed, the results for the folder are displayed in a main scroll box listing the following data elements: the specified path(s) 702, the names of every file found in the specified path(s) 704 and the file description data 706. The file description data 706 includes the date and time the file was created, the date and time the file was last modified and the size of the file. This data is repeated for each directory contained in the folder. In exemplary embodiments of the present invention, the result data is retrieved from the monitoring database located on the storage device 108. In alternative exemplary embodiments of the present invention, this information is printed to the screen as the file monitoring application receives it and the information is also stored in the database either concurrently or after it is printed to the screen.

The user interface depicted in FIG. 7 also includes a status bar 708. When it contains the word "idle" this indicates that the file monitoring application is waiting for its next scheduled event. When the status bar 708 includes the phrase "preparing e-mail" the process depicted in FIG. 6 is complete and an e-mail to the specified distribution list is being created and delivered. A status bar 708 message of "running" indicates that the process depicted in FIG. 6 is currently communicating to the specified servers and directories and collecting data. The user interface depicted in FIG. 7 may be invoked by a user, such as an administrator, at any time to perform tasks such as checking on status and invoking the process depicted in FIG. 6.

In addition, a user may select the view option from the toolbar 712 in FIG. 7. This results in the user being able to view a scroll box of all previous activity. This may be useful to conduct periodic comparisons of data. The data contained in the log of previous activity may be archived or deleted by the user (e.g., an administrator) by selecting the manage option from the toolbar 712. This historical information may be downloaded to a database for querying or it may be queried directly. Reports reflecting the history of a particular file and/or server and/or directory may be created from this data. In alternate exemplary embodiments of the present invention, this data is utilized to provide an automatic comparison between the current file size and the file size detected by the previous run of the file monitoring application. A current file size that is smaller than the previous file size triggers an e-mail alert to the administrator and/or to the listed recipients. This e-mail alert may be in addition to or in lieu of being notified after every execution of the file monitoring application. In exemplary embodiments of the present invention, the recipients may receive an e-mail report, such as the one depicted in FIG. 8 on a less frequent basis unless the file routing monitoring application detects a possible problem (e.g., file size is smaller than on previous run).

FIG. 8 is an exemplary e-mail notification format that may be utilized by exemplary embodiments of the present invention. This e-mail notification is sent as part of presenting data to a user in step 614 of FIG. 6. The sample format in FIG. 8 includes a high priority message being sent with a "from address" 802 that was specified in the administrator entry box 302 in FIG. 3. FIG. 8 also includes a "to address" 804 that includes the recipients entered by the user in the recipient e-mail address entry box 502 in FIG. 5. This e-mail is sent to all listed recipients. The subject 806 is "file checker" and includes the date and time that the file monitoring application was executed. There is one entry 808 in the report for each file path specified in the file path entry box 402 in FIG. 4. Each entry 808 includes the file path, the names of every file found in the specified path, the date and time each file in the path was created, the date and time each file in the path was last modified and the size of each file in the path. In alternate exemplary embodiments of the present invention, the results of the file monitoring application may also be transmitted as a text message to other devices such as e-mail addresses, interactive pagers and/or cellular telephones.

Exemplary embodiments of the present invention may be utilized to automate file monitoring. Monitoring tasks including: verifying file existence, checking file created dates, checking modified dates and checking file sizes may be performed by a user reading a report that is created and e-mailed to the user on a regular basis. This is contrasted with the user having to logon to a number of servers to look up the data manually. Server administrators, database administrators and web masters that are concerned with log file sizes, backup files or any other non-static files will be able to spend less time monitoring files (e.g., verifying that backups have been created) because portions of the monitoring process has been automated by exemplary embodiments of the present invention. Exemplary embodiments of the present invention provide one or more folders of file paths that are easy to create and modify. In addition, it is easy to modify the list of recipients and logging is built in to the system.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for monitoring files, said method comprising:
    receiving a folder including one or more file path identifiers each specifying a server machine and a directory;
    for each of said file path identifiers in said folder:
        transmitting a query to said specified server machine requesting current directory data corresponding to said specified directory, said current directory data including a file name, a created date, a modified date and a file size for each file included in said specified directory;
        receiving said current directory data from said server machine in response to said query;
        comparing said current directory data to a previous version of said directory data;
        transmitting an alert message if a previous file size in said previous version of said directory data is larger than a corresponding said file size in said current directory data; and
        storing said file path identifier and said current directory data in a monitoring database;
    creating a monitoring report based on contents of the monitoring database; and
    transmitting said monitoring report to a user.

2. The method of claim 1 further comprising adding a new file path identifier to said folder.

3. The method of claim 1 further comprising removing one of said file path identifiers from said folder.

4. The method of claim 1 further comprising:
    updating a recipient list associated with said folder, said recipient list including one or more e-mail addresses; and
    transmitting said monitoring report to said one or more e-mail addresses included in said recipient list.

5. The method of claim 1 further comprising creating a log file for said current directory data in response to said storing.

6. The method of claim 1 wherein said server machine is a local machine.

7. The method of claim 1 wherein said server machine is a remote machine and said query is transmitted via a network.

8. The method of claim 1 further comprising presenting said current directory data to a user.

9. The method of claim 8 wherein said presenting includes displaying said current directory data in a user interface screen.

10. The method of claim 1 further comprising creating a trigger event for said folder, wherein said receiving a folder is in response to said trigger event.

11. The method of claim 10 wherein said trigger event is a pre-selected time of day.

12. The method of claim 10 wherein said trigger event is a pre-selected time interval.

13. The method of claim 10 wherein said trigger event is an occurrence of a pre-specified event.

14. The method of claim 13 wherein said pre-specified event is a user launching a file monitoring application.

15. A system for monitoring files, the system comprising:
    a network;
    a storage device in communication with said network, wherein said storage device includes a monitoring database;
    a host system in communication with said network, said host system including application software to implement a method comprising:
        receiving a folder including one or more file path identifiers each specifying a server machine and a directory;
        for each of said file path identifiers in said folder:
            transmitting a query via said network to said specified server machine requesting current directory data corresponding to said specified directory, said current directory data including a file name, a created date, a modified date and a file size for each file included in said specified directory;
            receiving said current directory data from said server machine via said network in response to said query;
            comparing said current directory data to a previous version of said directory data;
            transmitting an alert message if a previous file size in said previous version of said directory is larger than a corresponding said file size in said current directory data; and
            storing said file path identifier and said current directory data in the monitoring database;
        creating a monitoring report based on contents of the monitoring database; and
        transmitting said monitoring report to a user.

16. The system of claim 15 wherein said application software is written in visual basic.

17. The system of claim 15 wherein said host system is a personal computer.

18. The system of claim 15 wherein said network is the Internet.

19. The system of claim 15 wherein said network in an intranet.

20. The system of claim 15 wherein said monitoring database is a relational database.

21. A computer program product for monitoring files, the computer program product comprising:
    a storage medium readable by a processing circuit and storing instructions for execution by the processing circuit for facilitating a method comprising:
        receiving a folder including one or more file path identifiers each specifying a server machine and a directory;

for each of said file path identifiers in said folder:
> transmitting a query to said specified server machine requesting current directory data corresponding to said specified directory, said current directory data including a file name, a created date, a modified date and a file size for each file included in said specified directory;
>
> receiving said current directory data from said server machine in response to said query;
>
> comparing said current directory data to a previous version of said directory data;
>
> transmitting an alert message if a previous file size in said previous version of said directory data is larger than a corresponding said file size in said current directory data; and
>
> storing said file path identifier and said current directory data in a monitoring database;

creating a monitoring report based on contents of the monitoring database; and transmitting said monitoring user.

* * * * *